(12) United States Patent
Attaluri et al.

(10) Patent No.: US 9,171,043 B2
(45) Date of Patent: Oct. 27, 2015

(54) DYNAMICALLY DETERMINING JOIN ORDER

(71) Applicant: International Business Machines Corporation, Armonk, NY (US)

(72) Inventors: Gopi K. Attaluri, San Jose, CA (US); Sam S. Lightstone, Toronto (CA); Vijayshankar Raman, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 291 days.

(21) Appl. No.: 13/755,784

(22) Filed: Jan. 31, 2013

(65) Prior Publication Data
US 2014/0214795 A1    Jul. 31, 2014

(51) Int. Cl.
*G06F 17/30* (2006.01)

(52) U.S. Cl.
CPC .... *G06F 17/30466* (2013.01); *G06F 17/30498* (2013.01)

(58) Field of Classification Search
CPC ............. G06F 17/30466; G06F 17/30463; G06F 17/30498
USPC ........................................ 707/713, 714, 718
See application file for complete search history.

(56) References Cited

U.S. PATENT DOCUMENTS

| | | | |
|---|---|---|---|
| 6,397,204 B1 * | 5/2002 | Liu et al. ................. | 707/999.2 |
| 6,490,593 B2 | 12/2002 | Proctor | |
| 7,774,336 B2 | 8/2010 | Beyer et al. | |
| 7,917,526 B2 | 3/2011 | Miao et al. | |
| 8,103,658 B2 | 1/2012 | Flatz et al. | |
| 8,126,872 B2 | 2/2012 | Corvinelli et al. | |
| 8,244,715 B2 | 8/2012 | Cole et al. | |
| 2005/0234900 A1 * | 10/2005 | Bossman et al. ................ | 707/4 |
| 2009/0006399 A1 * | 1/2009 | Raman et al. ................ | 707/7 |
| 2009/0024568 A1 * | 1/2009 | Al-Omari et al. ............... | 707/2 |
| 2010/0088315 A1 | 4/2010 | Netz et al. | |
| 2012/0089594 A1 | 4/2012 | Krishna et al. | |
| 2012/0246147 A1 | 9/2012 | Lamb et al. | |

OTHER PUBLICATIONS

Quangzhong et al., "Adaptively Reordering Joins During Execution", Proceedings of the IEEE 23rd Int. Conf. on Data Engineering, 2007 (ICDE 2007), Apr. 15-20, 2007, pp. 26-35. Conference in Istanbul, Turkey, but published in US by IEEE.
Attaluri et al., U.S. Appl. No. 13/753,769 , "Reducing Collisions Within a Hash Table", filed Jan. 30, 2013, 50 pages.
Attaluri et al., U.S. Appl. No. 13/753,740, "Join Operation Partitioning", filed Jan. 30, 2013, 51 pages.

* cited by examiner

*Primary Examiner* — Hares Jami
(74) *Attorney, Agent, or Firm* — Mohammed Kashef; Edell, Shapiro & Finnan, LLC

(57) ABSTRACT

A weight is determined for each of a plurality of join predicates for a join between one or more first database objects and one or more second database objects based on a join selectivity for each of the plurality of join predicates. The plurality of join predicates are sorted based on the determined weights. The join operation is performed joining the one or more first database objects with the one or more second database objects in accordance with an order of the sorted plurality of join predicates.

17 Claims, 9 Drawing Sheets

| TABLE A | |
|---|---|
| TableA.C1 | TableA.C2 |
| TAIDNO1 | Yes |
| TAIDNO1 | No |
| TAIDNO2 | Yes |
| TAIDNO2 | No |
| TAIDNO2 | No |
| TAIDNO2 | Yes |
| TAIDNO2 | No |
| TAIDNO2 | No |
| TAIDNO3 | No |
| TAIDNO3 | No |
| TAIDNO3 | Yes |
| TAIDNO11 | No |
| TAIDNO12 | No |
| TAIDNO13 | Yes |
| TAIDNO14 | Yes |
| TAIDNO15 | No |
| TAIDNO16 | No |

| TABLE B | | |
|---|---|---|
| TableB.C1 | TableB.C2 | TableB.C3 |
| TBIDNO1 | TAIDNO1 | 30 |
| TBIDNO2 | TAIDNO2 | 31 |
| TBIDNO4 | TAIDNO4 | 23 |
| TBIDNO5 | TAIDNO5 | 6 |
| TBIDNO6 | TAIDNO6 | 35 |
| TBIDNO7 | TAIDNO7 | 2 |
| TBIDNO8 | TAIDNO8 | 37 |
| TBIDNO9 | TAIDNO9 | 28 |
| TBIDNO10 | TAIDNO10 | 59 |
| TBIDNO11 | TAIDNO11 | 8 |
| TBIDNO12 | TAIDNO12 | 41 |
| TBIDNO13 | TAIDNO13 | 52 |
| TBIDNO14 | TAIDNO14 | 6 |
| TBIDNO15 | TAIDNO15 | 44 |

| TABLE C | | |
|---|---|---|
| TableC.C1 | TableC.C2 | TableC.C3 |
| TCIDNO1 | TAIDNO1 | 1/1/2001 |
| TCIDNO4 | TAIDNO3 | 8/3/2009 |
| TCIDNO5 | TAIDNO4 | 8/3/2009 |
| TCIDNO6 | TAIDNO5 | 1/1/2001 |
| TCIDNO7 | TAIDNO6 | 8/3/2009 |
| TCIDNO8 | TAIDNO7 | 5/7/2010 |
| TCIDNO9 | TAIDNO8 | 8/3/2009 |
| TCIDNO10 | TAIDNO9 | 5/7/2010 |
| TCIDNO11 | TAIDNO10 | 1/1/2001 |
| TCIDNO12 | TAIDNO11 | 8/3/2009 |
| TCIDNO13 | TAIDNO12 | 5/7/2010 |
| TCIDNO14 | TAIDNO13 | 8/3/2009 |
| TCIDNO15 | TAIDNO14 | 8/3/2009 |
| TCIDNO16 | TAIDNO15 | 1/1/2001 |

FIG.2

TABLE α

| Tableα.C1 | Tableα.C1' | Tableα.C2 |
|---|---|---|
| TAIDNO1 | 101 | Yes |
| TAIDNO1 | 101 | No |
| TAIDNO2 | 0 | Yes |
| TAIDNO2 | 0 | No |
| TAIDNO2 | 0 | No |
| TAIDNO2 | 0 | Yes |
| TAIDNO3 | 110 | No |
| TAIDNO3 | 110 | Yes |
| TAIDNO3 | 110 | Yes |
| TAIDNO11 | 1000 | No |
| TAIDNO12 | 1001 | No |
| TAIDNO13 | 11100 | Yes |
| TAIDNO14 | 11101 | Yes |
| TAIDNO15 | 1111 | No |

TABLE β

| Tableβ.C1 | Tableβ.C2 | Tableβ.C3 |
|---|---|---|
| TBIDNO1 | TAIDNO1 | 30 |
| TBIDNO2 | TAIDNO2 | 31 |
| TBIDNO4 | TAIDNO4 | 23 |
| TBIDNO5 | TAIDNO5 | 6 |
| TBIDNO6 | TAIDNO6 | 35 |
| TBIDNO7 | TAIDNO7 | 2 |
| TBIDNO8 | TAIDNO8 | 37 |
| TBIDNO9 | TAIDNO9 | 28 |
| TBIDNO10 | TAIDNO10 | 59 |
| TBIDNO11 | TAIDNO11 | 8 |
| TBIDNO12 | TAIDNO12 | 41 |
| TBIDNO13 | TAIDNO13 | 52 |
| TBIDNO14 | TAIDNO14 | 6 |
| TBIDNO15 | TAIDNO15 | 44 |
| TBIDNO16 | TAIDNO16 | 44 |

TABLE γ

| Tableγ.C1 | Tableγ.C2 | Tableγ.C3 |
|---|---|---|
| TCIDNO1 | TAIDNO1 | 1/1/2001 |
| TCIDNO2 | TAIDNO2 | 5/7/2010 |
| TCIDNO4 | TAIDNO3 | 8/3/2009 |
| TCIDNO5 | TAIDNO4 | 8/3/2009 |
| TCIDNO6 | TAIDNO5 | 1/1/2001 |
| TCIDNO7 | TAIDNO6 | 8/3/2009 |
| TCIDNO8 | TAIDNO7 | 5/7/2010 |
| TCIDNO9 | TAIDNO8 | 8/3/2009 |
| TCIDNO10 | TAIDNO9 | 5/7/2010 |
| TCIDNO11 | TAIDNO10 | 1/1/2001 |
| TCIDNO12 | TAIDNO11 | 8/3/2009 |
| TCIDNO13 | TAIDNO12 | 5/7/2010 |
| TCIDNO14 | TAIDNO13 | 8/3/2009 |
| TCIDNO15 | TAIDNO14 | 8/3/2009 |
| TCIDNO16 | TAIDNO15 | 1/1/2001 |

FIG.4

TABLE G

| TableG.C1 | TableG.C2 | TableG.C3 |
|---|---|---|
| TGIDNO1 | 1/1/01 | Yes |
| TGIDNO1 | 6/7/10 | No |
| TGIDNO1 | 10/3/09 | Yes |
| TGIDNO1 | 11/4/09 | No |
| TGIDNO1 | 6/1/02 | Yes |
| TGIDNO1 | 10/3/10 | Yes |
| TGIDNO1 | 11/8//10 | No |
| TGIDNO1 | 12/3/09 | No |
| TGIDNO2 | 6/7/12 | No |
| TGIDNO2 | 10/1/05 | Yes |
| TGIDNO3 | 11/5/09 | No |
| TGIDNO3 | 12/7/06 | No |
| TGIDNO3 | 6/28/09 | Yes |
| TGIDNO3 | 10/30/09 | Yes |
| TGIDNO3 | 11/14/01 | No |

TABLE H

| TableH.C1 | TableH.C2 | TableG.C3 | TableH.C4 |
|---|---|---|---|
| TGIDNO1 | THIDNO1 | 1/1/01 | 30 |
| TGIDNO2 | THIDNO1 | 5/7/10 | 31 |
| TGIDNO3 | THIDNO1 | 8/3/09 | 4 |
| TGIDNO4 | THIDNO1 | 8/3/09 | 23 |
| TGIDNO5 | THIDNO1 | 1/1/01 | 6 |
| TGIDNO6 | THIDNO1 | 8/3/09 | 35 |
| TGIDNO7 | THIDNO1 | 5/7/10 | 2 |
| TGIDNO8 | THIDNO1 | 8/3/09 | 37 |
| TGIDNO9 | THIDNO2 | 5/7/10 | 28 |
| TGIDNO10 | THIDNO2 | 1/3/01 | 59 |
| TGIDNO11 | THIDNO3 | 8/3/09 | 8 |
| TGIDNO12 | THIDNO3 | 5/7/10 | 41 |
| TGIDNO13 | THIDNO3 | 8/3/09 | 52 |
| TGIDNO14 | THIDNO3 | 8/3/09 | 6 |
| TGIDNO15 | THIDNO3 | 1/4/01 | 44 |

FIG.7

TABLE G

| TableG.C1 | TableG.C3 |
|---|---|
| TAIDNO1 | Yes |
| TAIDNO2 | No |
| TAIDNO3 | Yes |
| TAIDNO4 | No |
| TAIDNO5 | Yes |
| TAIDNO6 | Yes |
| TAIDNO7 | No |
| TAIDNO8 | No |
| TAIDNO9 | No |
| TAIDNO10 | Yes |
| TAIDNO11 | No |
| TAIDNO12 | No |
| TAIDNO13 | Yes |
| TAIDNO14 | Yes |
| TAIDNO15 | No |

TABLE H

| TableH.C1 | TableH.C2 | TableH.C3 |
|---|---|---|
| TBIDNO1 | TAIDNO1 | 30 |
| TBIDNO2 | TAIDNO1 | 31 |
| TBIDNO3 | TAIDNO1 | 4 |
| TBIDNO4 | TAIDNO1 | 23 |
| TBIDNO5 | TAIDNO1 | 6 |
| TBIDNO6 | TAIDNO1 | 35 |
| TBIDNO7 | TAIDNO1 | 2 |
| TBIDNO8 | TAIDNO1 | 37 |
| TBIDNO9 | TAIDNO2 | 28 |
| TBIDNO10 | TAIDNO2 | 59 |
| TBIDNO11 | TAIDNO2 | 8 |
| TBIDNO12 | TAIDNO2 | 41 |
| TBIDNO13 | TAIDNO3 | 52 |
| TBIDNO14 | TAIDNO3 | 6 |
| TBIDNO15 | TAIDNO3 | 44 |

TABLE I

| TableI.C1 | TableI.C2 | TableI.C3 |
|---|---|---|
| TCIDNO1 | TAIDNO1 | 1/1/01 |
| TCIDNO2 | TAIDNO2 | 5/7/10 |
| TCIDNO3 | TAIDNO3 | 8/3/09 |
| TCIDNO4 | TAIDNO4 | 8/3/09 |
| TCIDNO5 | TAIDNO5 | 1/1/01 |
| TCIDNO6 | TAIDNO6 | 8/3/09 |
| TCIDNO7 | TAIDNO25 | 5/7/10 |
| TCIDNO8 | TAIDNO26 | 8/3/09 |
| TCIDNO9 | TAIDNO27 | 5/7/10 |
| TCIDNO10 | TAIDNO28 | 1/1/01 |
| TCIDNO11 | TAIDNO29 | 8/3/09 |
| TCIDNO12 | TAIDNO30 | 5/7/10 |
| TCIDNO13 | TAIDNO31 | 8/3/09 |
| TCIDNO14 | TAIDNO32 | 8/3/09 |
| TCIDNO15 | TAIDNO33 | 1/1/01 |

FIG. 8

DYNAMICALLY DETERMINING JOIN ORDER

BACKGROUND

1. Technical Field

Present invention embodiments relate to databases, and more specifically, to join order.

2. Discussion of the Related Art

When executing a join in a database system, such as a join for a query, a query plan is constructed by a query optimizer. The performance of a query plan is determined largely by the order in which the tables are joined. For example, when joining three tables A, B and C of size 10 rows, 10,000 rows, and 1,000,000 rows, respectively, a query plan that joins B and C first can take several orders-of-magnitude more time to execute than one that joins A and C first.

Choosing the best join order for a query is non-trivial and challenging especially due to the absence of table statistics or staleness of statistics. Even with the latest and most thoroughly collected statistics, join order selection tray rely on cardinality and correlation estimates that can be imperfect.

BRIEF SUMMARY

According to one embodiment of the present invention, a computer-implemented method of joining one or more first database objects with one or more second database objects is described. A weight is determined for each of a plurality of join predicates between one or more of the first database objects and one or more of the second database objects based on a join selectivity for each of the plurality of join predicates. The plurality of join predicates are sorted based on the determined weights. The join operation is performed joining the one or more first database objects with the one or more second database objects in accordance with an order of the sorted plurality of join predicates.

BRIEF DESCRIPTION OF THE SEVERAL VIEWS OF THE DRAWINGS

Generally, like reference numerals in the various figures are utilized to designate like components.

FIG. 2 depicts example database tables for joining according to a query.

FIG. 4 depicts example frequency-encoded tables for joining according to a query.

FIG. 7 depicts example database tables for joining according to a query.

FIG. 8 depicts further example database tables for joining according to a query.

DETAILED DESCRIPTION

Figure 1:
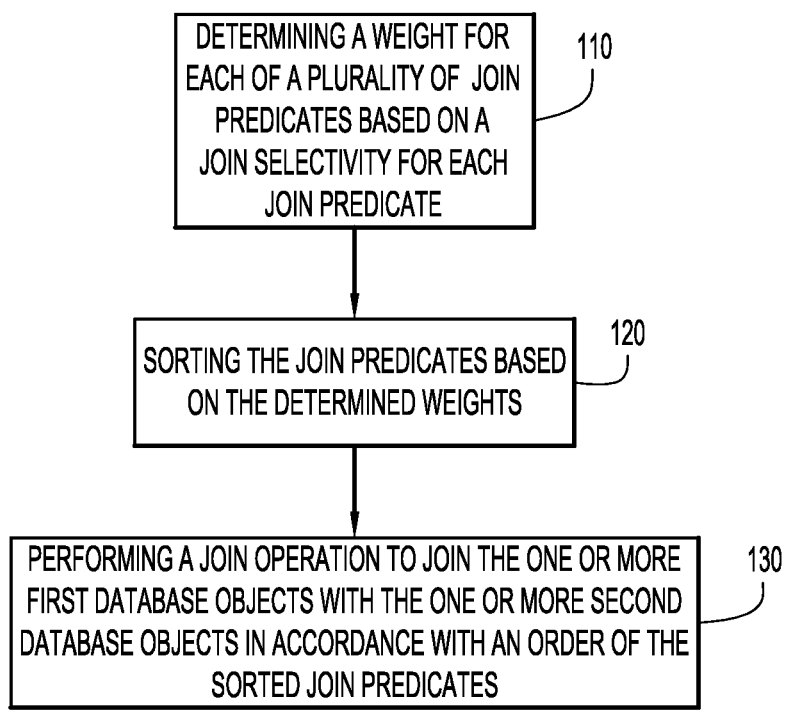
FIG. 1 depicts a flow chart illustrating a method for joining one or more first database objects with one or more second database objects according to an embodiment of the present invention.

With reference now made to FIG. 1, depicted therein is flowchart 100 illustrating an example process for joining one or more first database objects with one or more second database objects according to an embodiment of the present invention. The process begins in step 110 where a weight is determined for each of the plurality of join predicates for joins between the one or more first database objects and the one or more second database objects. This weight may be based on a join selectivity for each of the join predicates. According to one specific example, the weights may be determined according to the following formula:

$$\text{Join weight} = \frac{(1 - \text{selectivity})}{\text{lookup\_cost}}$$

As used above, "selectivity" is an indication of how many rows a particular action will need to be performed on. For example, in a join operation, the selectivity is an estimation of the portion of the total number of rows in the table that will need to be included in a join. "Look-up Cost" as used above, is an estimation of the resources that would be used to perform the join.

A method of calculating selectivity, which assumes a uniform distribution of values in the tables being joined, calculates the number of distinct values which satisfy the join predicate from the outer leg of the join divided by the total number of rows in the outer leg table. In order to illustrate the idea of selectivity, reference will now be made to FIG. 2. Depicted in FIG. 2 are three tables, Table A, Table B and Table C, which are to be joined according to the following query:

```
SELECT TableA.C1, TableA.C2, TableB.C3, TableC.C3
FROM TableA
JOIN TableB ON TableA.C1 = TableB.C2
JOIN TableC ON TableA.C1 = TableC.C2
WHERE TableA.C2 = "No"
```

Accordingly, Table A will be joined with Table B where the value of the TableA.C1 matches the values of TableB.C2, and where the values in TableA.C2 have a value of "No." In other words, Table A is the outer leg of the join, Table B is the inner leg of the join, and the predicate for the join is the condition that rows from Table B will be joined with rows from Table A where the TableB.C2 column values match the values at the TableA.C1 column. The requirement that the value of TableA.C.2 have a value of "No" is considered a local predicate for Table A. Similarly, Table A will be joined to Table C where the values of the TableA.C1 column match the values of the TableC.C2 column.

To calculate the selectivity for the join predicate between Table A and Table B, assuming a uniform distribution of values in the tables, the number of distinct values in TableA.C1 which survive the local predicate on Table A and satisfy the local predicate are calculated. There are five distinct values in TableA.C1 that survive the local predicate and that equal a value in TableB.C2. Specifically, these values are "TAIDNO1," "TAIDNO2," "TAIDNO11," "TAIDNO12," and "TAIDNO15." Accordingly, the selectivity for the join predicate with Table B will be calculated by dividing "5," the number of distinct values that satisfy the join predicate, by the total number of rows in Table A. Giving a value of:

$$\text{Selectivity for Table } B = \frac{5}{15} \approx 0.333.$$

On the other hand, Table A has six distinct values which survive the local predicate and satisfy the join predicate with Table C, these values being "TAIDNO1," "TAIDNO3," "TAIDNO11," "TAIDNO12," "TAIDNO15" and "TAIDNO16." Accordingly, the selectivity for the join predicate with Table C is:

$$\text{Selectivity for Table } C = \frac{6}{15} = 0.4.$$

Placing the "selectivity" values in the formula for "join weight" gives the following:

$$\text{Join Weight for Table } B = \frac{(1-0.333)}{\text{lookup\_cost}}$$
$$= \frac{0.667}{\text{lookup\_cost}}; \text{ and}$$

$$\text{Join Weight for Table } C = \frac{(1-0.4)}{\text{lookup\_cost}}$$
$$= \frac{0.6}{\text{lookup\_cost}}.$$

If it is assumed that the "Look-up Cost" for Table B is the same as the "Look-up Cost" for Table C, it can be shown that the predicate for Table B will be weighted more highly than Table C.

Returning to FIG. 1, having determined the join weight for each of the plurality of join predicates, the process moves to step 120 where the join predicates are sorted according to the determined weights. Once again using the example of Table A being joined with Table B and Table C, and using the weight determinations described above, the predicate for Table B will be ordered before the predicate for Table C because it is weighted more highly than Table C.

The process concludes in step 130, where the join operation is performed on the one or more first database objects with the plurality of second database objects in accordance with an order of the sorted predicates. Remaining with the example of Table A, Table B and Table C, Table A will first be joined with Table B because the predicate for the join with Table B is ordered before the predicate for the join with Table C. Once the join with Table B is completed, the join with Table C is performed.

As noted above, the calculations described above assume a uniform distribution of values in Table A. More specifically, the calculations assume a uniform distribution of TableA.C1 values. The same assumption is made with regard to the values in Table B and Table C. But, in real-world databases, this assumption may not be true. In fact, reviewing Table A of FIG. 2 shows that the values of TableA.C1 are not uniformly distributed. In order to account for a non-uniform distribution, the frequency with which each of the values in an outer leg of a join satisfy the join predicate can be used when calculating the selectivity for the predicate, and therefore, will also be considered when weighting the predicates. Using the specific example described above, the frequency of the values in Table A which satisfy the join predicates, also described above, can be used when weighting and ordering Table B and Table C for joining with Table A.

Figure 3:
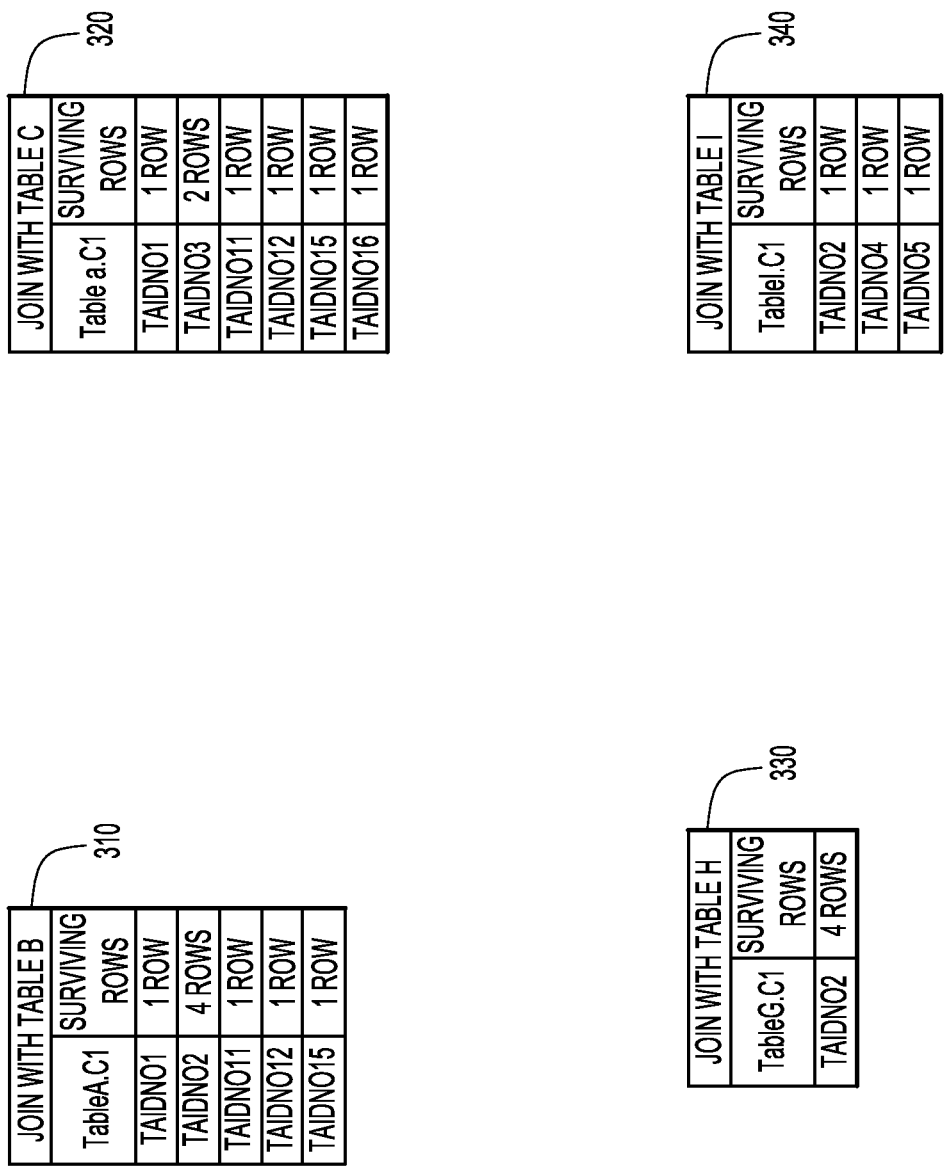
FIG. 3 depicts the frequency of values used to perform a join between database objects.

Turning to FIG. 3, depicted therein are charts 310 and 320 which illustrate the frequencies of the values in Table A which survive the local predicate and satisfy the join predicates for joining with Table B and Table C, respectively. As illustrated in chart 310, there are five distinct values of TableA.C1 that match a value of TableB.C2, but a total of 8 rows correspond to those distinct values. Accordingly, the frequency of "TAIDNO1" in Table A which satisfies the local and join predicates is "1 out of 15." Similarly, the frequency of "TAIDNO2" in Table A is "4 out of 15." The frequency of "TAIDNO11" in Table A is "1 out of 15," the frequency of "TAIDNO12" in Table A is "1 out of 15," and the frequency of "TAIDNO15" in Table A is "1 out of 15." By combining these frequencies, it can be determined that the total frequency for values that satisfy the join predicate between Table A and Table B is:

$$\text{Selectivity for Table } B = \frac{1}{15} + \frac{4}{15} + \frac{1}{15} + \frac{1}{15} + \frac{1}{15}$$
$$= \frac{8}{15}$$
$$\approx 0.533.$$

In other words, the total frequency for values in Table A that satisfy the predicate for joining with Table B is 0.533.

On the other hand, as illustrated in chart 320, Table A has six distinct values of TableA.C1 that match a value of TableC.C2, and that also survive the join predicate on Table A. Specifically, there is one row in Table C where the value of TableC.C2 matches the values of Table A.C1 of "TAIDNO1." Accordingly, the frequency of "TAIDNO1" in Table A is "1 out of 15." There are two rows in Table A where the value of TableA.C1 matches the values of TableC.C2 of "TAIDNO3." Accordingly, the frequency of "TAIDNO3" in Table A is "2 out of 15." There is one row in Table A where the value of TableA.C1 matches the values of TableC.C2 of "TAIDNO11." Accordingly, the frequency of "TAIDNO11" in Table A is "1 out of 15." There is one row in Table A where the value of TableA.C1 matches the values of TableC.C2 of "TAIDNO12." Accordingly, the frequency of "TAIDNO12" in Table A is "1 out of 15." There is one row in Table A where the value of TableA.C1 matches the values of TableC.C2 of "TAIDNO15." Accordingly, the frequency of "TAIDNO15" in Table A is "1 out of 15." Finally, there is one row in Table A where the value of TableA.C1 matches the values of TableC.C2 of "TAIDNO16." Accordingly, the frequency of "TAIDNO16" in Table A is "1 out of 15." By combining these frequencies, it can be determined that the total frequencies, or selectivity, for values that satisfy the join predicate between Table A and Table C is:

$$\text{Selectivity for Table } C = \frac{1}{15} + \frac{2}{15} + \frac{1}{15} + \frac{1}{15} + \frac{1}{15} + \frac{1}{15}$$
$$= \frac{7}{15}$$
$$\approx 0.467.$$

When the selectivities which account for the frequency of the values of the inner join legs are used to calculate the join weights, the following values are received:

$$\text{Join Weight for Table } B = \frac{(1 - 0.533)}{\text{lookup\_cost}}$$
$$= \frac{0.467}{\text{lookup\_cost}}; \text{ and}$$

$$\text{Join Weight for Table } C = \frac{(1 - 0.467)}{\text{lookup\_cost}}$$
$$= \frac{0.533}{\text{lookup\_cost}}.$$

Using the join weights that account for the actual frequencies of values that satisfy the join predicates, and once again assuming that the look-up costs are the same for Table B and Table C, it can be seen that the predicate for joining Table C will be weighted more highly than the predicate for joining Table B, and therefore, Table C will be joined with Table A before Table B is joined with Table A. Comparing this example with the example described above in which the frequencies are not considered, it can be seen that utilizing the frequencies can alter the join order, resulting in a more efficient join.

The frequencies used above for the values which satisfy the join predicates may be determined through scanning values in the tables. Computer implemented methods may acquire the frequency during run-time for performing the join in the same manner. For example, a database engine may scan or sample the tables being joined in order to determine the frequencies for the values which satisfy the join predicate. Specifically, the query optimizer of the database engine may perform the scanning of the data rows to determine the frequencies of the data values. According to other examples, the frequencies for the values may be stored in database objects, such as a data dictionary for the database objects being joined.

According to other examples, the frequencies may be determined from the actual values of the data items, or the manner in which the data items are stored in the database. For example, many database systems utilize frequency-based encoding, such as Huffman encoding, in order to efficiently store database data. Frequency-based encoding is a method of encoding data in which data values are replaced with code words where the length of the code word is related to the frequency of how often the underlying data value appears in the data set. Specifically, according to some frequency-based encoding schemes, data values that occur more frequently are encoded using shorter code words, while data values that occur less frequently are encoded with longer code words. If the code words are chosen such that the more frequently occurring values are encoding using code words which require less memory than the underlying data value, frequency encoding can result in significant storage and bandwidth savings.

Turning now to FIG. 4, depicted therein are Table α, Table β and Table γ which illustrate a simple example of frequency-based encoded data. In Table α, column Tableα.C1 represents the actual data values while Tableα.C1' illustrates how the data may be encoded and actually stored in the database. Because the value "TAIDNO2" appears most frequently, it is given the shortest code word, in this case a 1-bit code word of "0." The value "TAIDNO3" also appears frequently, but not as frequently as "TAIDNO2." Accordingly, the value "TAIDNO3" receives a short code word, "110," but it is not as short as the code word for "TAIDNO2." Similarly, the value to "TAIDNO1" also receives a code word, "101," which is longer than the code word for "TAIDNO2," but that is still relatively short. Finally, the values for "TAIDNO11," "TAIDNO12," "TAIDNO13," TAIDNO14," and "TAIDNO15" all receive relatively longer, 4- and 5-bit code words because they appear less frequently than the other values in the table.

In order to appropriately encode and decode database values, the manner in which values are to be encoded and decoded may be stored in the metadata for a data object. For example, the data dictionary for a database table may include the information necessary to encode a data value to its appropriate code word, as well as the information to decode a code word to the appropriate data value. Included in this information, may be an indication of the frequency with which each value appears in the frequency encoded table.

When data is stored using frequency-based encoding, the database engine can exploit the features of frequency-based encoding in order to appropriately weight, and therefore order, the predicates in a join. For example, the following query, which is analogous to the query run above on the tables of FIG. 2, is run against the tables FIG. 4:

```
SELECT Tableα.C1, Tableα.C2, Tableβ.G3, Tableγ.C3
FROM Tableα
JOIN Tableβ ON Tableα.C1 = Tableβ.C2
JOIN Tableγ ON Tableα.C1 = Tableγ.C2
WHERE Tableα.C2 = "No"
```

Because the frequency information for the values stored in Table is maintained in the metadata associated with Table α, once it is determined which values from Table A satisfy the join predicate, the dictionary for Table α may be used to determine the frequency of the values in Table α.

Specifically, frequency information for each value in Table α may be stored in the data dictionary for Table α. Once it is determined that the value "TAIDNO1" satisfies the join predicate, a query optimizer, for example, needs only look to the data dictionary for Table α to determine the frequency of "TAIDNO1" in Table α. Similarly, when the other values which satisfy either of the join predicates for joining with Table β or Table γ are determined, the frequency of these values in Table α may be determined by referencing the data dictionary of Table A without scanning the contents of the table.

According to other examples, the frequency of the coded values may not be explicitly stored in the data dictionary for the table, such as Table α. Instead, the data dictionary may simply indicate how specific values are encoded for storage in the respective table. Nevertheless, because the encoded values are indicative of the frequency of the values in a frequency encoded table, the data dictionary may still be used to determine the frequency for the values that satisfy the join predicates for the query.

Figure 5:
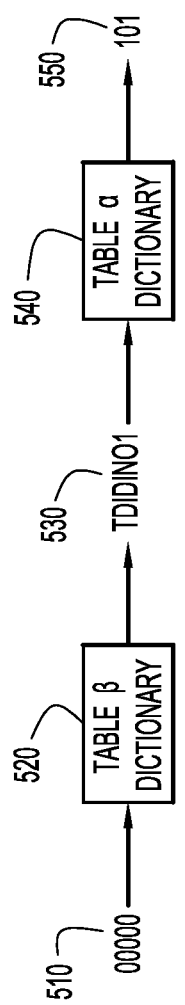
FIG. 5 depicts decoding and encoding of database object values for performing a join operation.

Turning now to FIG. 5, depicted therein is an illustration of how the data dictionary for a database object may be used to determine the frequency for entries in the inner leg of a join. A frequency encoded value 510 from the inner leg of a join, such as Table β of FIG. 4, may be decoded according to its own data dictionary, resulting in unencoded valued 530. The unencoded value 530 may then be re-encoded according to the data dictionary 540 of the outer leg of the join, such as the data dictionary for Table α of FIG. 4. After encoding according to data dictionary 540, a second encoded value 550 is produced. If the table of the outer leg of the join is encoded according to a frequency encoding method, the length of second encoded value 550 may be used to determine the frequency of unencoded value 530 in the outer leg table of the join. Because the outer leg table dictionary 540 may also include information indicating the total number of rows in the outer leg of the join, the frequency of encoded values 530 in the outer leg of the join may be determined without ever analyzing the content of the data stored in the outer leg of the join.

While the examples described above utilize exact frequency values, techniques using the length of encoded values to determine relative frequencies, and then using these relative values may also be implemented. Similarly, estimated frequencies may also be used if they are sufficient to meet the needs of the database system. For example, in certain frequency encoding schemes the frequency for a specific values is related to the number of bits used to encode the value according to the following relationship:

$$frequency \approx \left(\frac{1}{2}\right)^N;$$

where N is the number of bits used to encode the value.

Applying this formula to the example described above with reference to FIG. 4, the following estimated values can be calculated for each of the values that satisfy the join predicates between Table α and Table β, and Table α and Table γ, respectively.

Specifically, for the join between Table α and Table β, the values "TAIDNO1," TAIDNO2," TAIDNO11," "TAIDNO12," and "TAIDNO15" survive the local predicate and satisfy the join predicate. Using the formula for frequency, the frequency for each of these values may be determined as follows:

"*TAIDNO1*" is encoded using 3-bits, therefore, its $$frequency \approx \left(\frac{1}{2}\right)^3 = 0.125;$$

"*TAIDNO2*" is encoded using 1-bit, therefore, its $$frequency \approx \left(\frac{1}{2}\right)^1 = 0.5;$$

"*TAIDNO11*" is encoded using 4-bits, therefore, its $$frequency \approx \left(\frac{1}{2}\right)^4 = 0.0625;$$

"*TAIDNO12*" is encoded using 4-bits, therefore, its $$frequency \approx \left(\frac{1}{2}\right)^4 = 0.0625; \text{ and}$$

"*TAIDNO15*" is encoded using 4-bits, therefore, its $$frequency \approx \left(\frac{1}{2}\right)^4 = 0.0625.$$

Summing these values gives a total selectivity of:

Selectivity for Table β=0.125+0.5+0.0625+0.0625+ 0.0625=0.8125.

Using the values which survive the local predicate and satisfy the join predicate with Table γ gives the following values:

"*TAIDNO1*" is encoded using 3-bits, therefore, its $$frequency \approx \left(\frac{1}{2}\right)^3 = 0.125;$$

"*TAIDNO2*" is encoded using 1-bit, therefore, its $$frequency \approx \left(\frac{1}{2}\right)^1 = 0.5;$$

"*TAIDNO3*" is encoded using 3-bits, therefore, its $$frequency \approx \left(\frac{1}{2}\right)^3 = 0.125;$$

"*TAIDNO11*" is encoded using 4-bits, therefore, its $$frequency \approx \left(\frac{1}{2}\right)^4 = 0.0625;$$

"*TAIDNO12*" is encoded using 4-bits, therefore, its $$frequency \approx \left(\frac{1}{2}\right)^4 = 0.0625; \text{ and}$$

"*TAIDNO15*" is encoded using 4-bits, therefore, its $$frequency \approx \left(\frac{1}{2}\right)^4 = 0.0625.$$

Summing these values gives a total selectivity of:

Selectivity for Table β=0.125+0.5+0.0125+0.0625+ 0.0625+0.0625=0.9375.

When using these estimated values for the frequencies, the join with between Table α and Table β will be performed before the join between Table α and Table γ.

It is noted that the estimate calculated above are different than the actual frequency values. This may be due to the limited size of the examples used herein. Furthermore, because the ordering of the join predicates is the same as would be calculated using the actual frequencies, the estimated values successfully order the joins.

Figure 6:
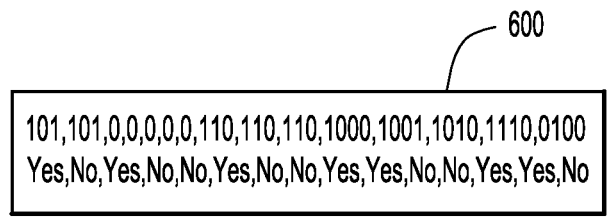
FIG. 6 depicts a column-oriented database object for performing a join operation.

With reference now made to FIG. 6, depicted therein is an example column oriented view of Table α of FIG. 4 which illustrates how the techniques described herein may be applied to column oriented databases. In a column oriented database, the underlying two-dimensional tables are stored as one-dimensional strings. According to one example of a column oriented database, the data from a single column are serialized together as a single row of the string, with comma characters separating the data for different records. Accordingly, the data from column TableA.C1' of Table α from FIG. 4 is serialized in the first line of string 600 of FIG. 6. The second line of string 600 is comprised of the data from column Tableα.C2 of Table α of FIG. 4. According to other examples, column Tableα.C2 may also be frequency encoded, and commas may not be used to delimitate the values of the string. Of course, as illustrated in the previous examples, the techniques described herein are not limited to column oriented data objects.

The first value in the first row of string 600 and the first value in the second row of string 600 make up the values stored in row 422 of Table α. Similarly, the second values in the first and second row of string 600 correspond to row 424 of Table α, the third values in the first and second row of string 600 correspond to row 426 of Table α, and the fourth values in the first and second row of string 600 correspond to row 428 of Table α. The string continues in this fashion such that the last values in the first and second row of string 600 correspond to the last row, row 432, of Table α.

The techniques described herein may be applied to column oriented databases because the arrangement of the data therein can easily accept frequency-based encoding, such as Huffman coding, as well as other encoding schemes such as Limpel-Ziv-Welch encoding and run-length encoding. Specifically, because column values are serialized together, frequency-based and other encoding schemes which are based on the comparisons between column values can be easily applied to the column data.

With reference now made to FIG. 7, depicted therein are two tables, Table G and Table H, which are to be joined in order to execute the following query:

```
SELECT TableG.C1, TableG.C2, TableH.C4
FROM TableG
JOIN TableH ON TableG.C1 = TableH.C1 AND TableG.C2 =
TableH.C3
```

Unlike the examples above, only two tables, Table G and Table H, are being joined. Nevertheless, a plurality of join predicates are still used to perform the join. Accordingly, the techniques described above are applicable to this join, for example, if it is more efficient to join on single column keys than on composite keys.

For example, a selectivity and weight may be calculated for the first join predicate: "TableG.C1=TableH.C1." As can be seen in FIG. 7, three distinct values, "TGIDNO1", "TGIDNO2" and "TGIDNO3" survive the predicate. The value "TGIDNO1" has a frequency of "8 out of 15", the value "TGIDNO2" has a frequency of "2 out of 15", and the value "TGIDNO3" has a frequency of "5 out of 15." Accordingly, the selectivity for the predicate "TableG.C1=TableH.C2" is:

$$\text{Selectivity for "}TableG.C1 = TableH.C2\text{"} = \frac{8}{15} + \frac{2}{15} + \frac{5}{15} = \frac{15}{15} = 1.$$

For the predicate "Table G.C2=TableH.C3", there is only one value that satisfies the predicate, the value of "1/1/01." This value has a frequency of "1 out of 15." Accordingly, the selectivity for the second predicate is:

$$\text{Selectivity for "}TableG.C2 = TableH.C3\text{"} = \frac{1}{15} \approx 0.0666.$$

Using the calculated selectivities, the weights for each predicate can also be calculated:

$$\text{Join Weight "}TableG.C1 = TableH.C2\text{"} =$$
$$\frac{(1-1)}{\text{lookup\_cost}} = \frac{0}{\text{lookup\_cost}}; \text{ and}$$
$$\text{Join Weight "Table }G.C2 = TableH.C3\text{"} = \frac{(1-0.0666)}{\text{lookup\_cost}} = \frac{0.9334}{\text{lookup\_cost}}.$$

If we once again assume that the look-up cost for each join is the same, it can be seen that the predicate "Table G.C2=TableH.C3" will be weighted higher than the predicate "TableG.C1=TableH.C1." Therefore, the predicate "Table G.C2=TableH.C3" will be ordered first when performing the join between Table G and Table H.

Of course, if Table G and Table H are encoded using frequency-based encoding, the techniques described above with reference to FIGS. 4 and 5 can be easily applied to joins such as the join described above with reference to FIG. 7.

The techniques described herein may also be applied to tables in which the frequency of data in the inner legs is not uniform. Take for example the following query to be run on Table G, Table H and Table I of FIG. 8.

```
SELECT TableG.C1, TableG.C2, TableH.C3, TableI.C3
FROM TableG
JOIN TableH ON TableG.C1 = TableH.C2
JOIN TableI ON TableG.C1 = TableI.C2
WHERE TableG.C3 = "No".
```

Returning to FIG. 3, depicted therein are charts 330 and 340 which illustrate the frequencies of the values in Table H and Table I, respectively, which satisfy the join predicates for joining with Table G and also survive the local predicate for Table G. Specifically, one distinct value from Table H satisfies the join predicate between Table G and Table H while also surviving the local predicate on Table G, but this value appears in four rows of Table H. On the other hand, three distinct values of Table I satisfy the join predicate with Table G while also surviving the local predicate on Table G, with each value only appearing in a single row in table I. Using these values, the selectivities for the joins are as follows:

$$\text{Selectivity for Table } H = \frac{4}{15} \approx 0.267; \text{ and}$$
$$\text{Selectivity for Table } I = \frac{1}{15} + \frac{1}{15} + \frac{1}{15} = \frac{3}{15} = 0.2.$$

When these selectivities are used to calculate the join weights, the following values are received:

$$\text{Join Weight for Table } H = \frac{(1 - 0.267)}{\text{lookup\_cost}}$$
$$= \frac{0.733}{\text{lookup\_cost}}; \text{ and}$$
$$\text{Join Weight for Table } I = \frac{(1 - 0.2)}{\text{lookup\_cost}}$$
$$= \frac{0.8}{\text{lookup\_cost}}.$$

Assuming that the look-up costs are the same for Table H and Table I, it can be seen that the predicate for joining Table I will be weighted slightly higher than the predicate for joining Table H, and therefore, Table I will be joined with Table G before Table H is joined with Table G, even though there are more distinct values that survive the join between Table G and Table I.

Figure 9:
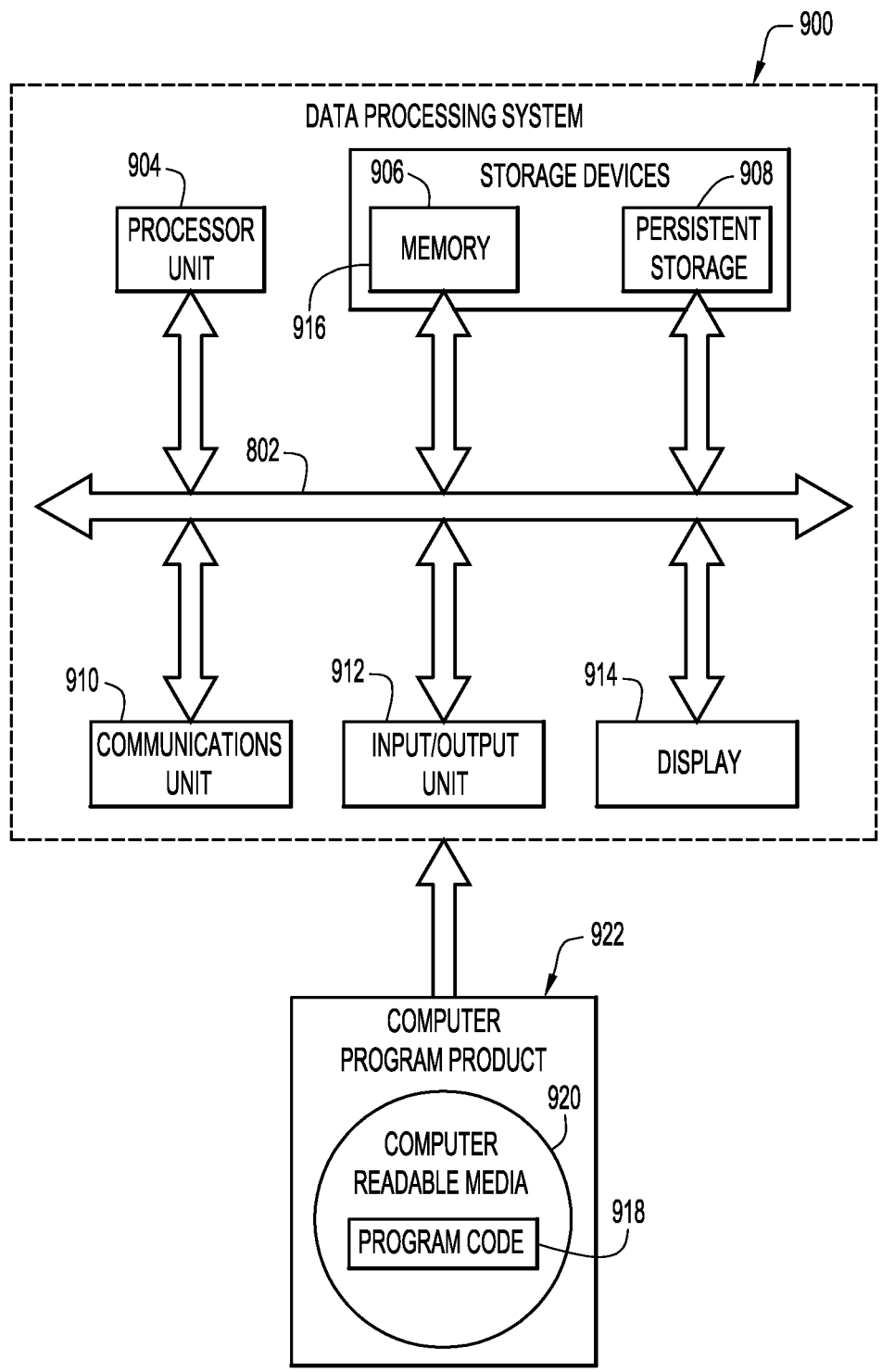
FIG. 9 depicts a block diagram of an apparatus configured to perform queries joining one or more first database objects with one or more second database objects according to an embodiment of the present invention.

Depicted in FIG. 9 is a block diagram of a data processing system in which the examples described herein may be implemented. Data processing system 900 is an example of a computer, such as a server or a client, in which computer readable program code or instructions implementing the processes may be located for the examples described herein. In this example, data processing system 900 includes communications fabric 902, which provides communications between processor unit 904, memory 906, persistent storage 908, communications unit 910, input/output (I/O) unit 912, and display 914.

Processor unit 904 serves to execute instructions for software that may be loaded into memory 906. Processor unit 904 may be a set of one or more processors or may be a multi-processor core, depending on the particular implementation. Further, processor unit 904 may be implemented using one or more heterogeneous processor systems in which a main processor is present with secondary processors on a single chip. As another illustrative example, processor unit 904 may be a symmetric multi-processor system containing multiple processors of the same type.

Memory 906 and persistent storage 908 are examples of storage devices 916. A storage device is any piece of hardware that is capable of storing information, such as, for example without limitation, data, program code in functional form, and/or other suitable information either on a temporary basis and/or a permanent basis. Memory 806, in these examples, may be, for example, a random access memory or any other suitable volatile or non-volatile storage device. Persistent storage 908 may take various forms depending on the particular implementation. For example, persistent storage 908 may contain one or more components or devices. For example, persistent storage 908 may be a hard drive, a flash memory, a rewritable optical disk, a rewritable magnetic tape, or some combination of the above. The media used by persistent storage 808 also may be removable. For example, a removable hard drive may be used for persistent storage 808.

Communications unit 810, in these examples, provides for communications with other data processing systems or devices. Communications unit 810 may provide communications through the use of either or both physical and wireless communications links.

Input/output unit 912 allows for input and output of data with other devices that may be connected to data processing system 900. For example, input/output unit 912 may provide a connection for user input through a keyboard, a mouse, and/or some other suitable input device. Further, input/output unit 912 may send output to a printer. Display 914 provides a mechanism to display information to a user.

Instructions for the operating system, applications and/or programs may be located in storage devices 916, which are in communication with processor unit 904 through communications fabric 902. According to examples, the instructions are in a functional form on persistent storage 908. These instructions may be loaded into memory 906 for execution by processor unit 904. The processes of the different embodiments may be performed by processor unit 904 using computer implemented instructions, which may be located in a memory, such as memory 906.

These instructions are referred to as program code, computer readable program code that may be read and executed by a processor in processor unit 904. The program code in the different embodiments may be embodied on different physical or tangible computer readable media, such as memory 906 or persistent storage 908.

Program code 918 is located in a functional form on computer readable media 920 that is selectively removable and may be loaded onto or transferred to data processing system 800 for execution by processor unit 904. Program code 918 and computer readable media 920 form computer program product 922 in these examples.

The different components illustrated for data processing system 900 are not meant to provide architectural limitations to the manner n which different embodiments may be implemented. The different illustrative embodiments may be implemented in a data processing system including components in addition to or in place of those illustrated for data processing system 900. Other components shown in FIG. 9 can be varied from the illustrative examples shown. The different embodiments may be implemented using any hardware device or system capable of executing program code. As one example, the data processing system may include organic components integrated with inorganic, components and/or may be comprised entirely of organic components excluding a human being. For example, a storage device may be comprised of an organic semiconductor.

As another example, a storage device in data processing system 900 is any hardware apparatus that may store data. Memory 906, persistent storage 908 and computer readable media 920 are examples of storage devices in a tangible form.

In another example, a bus system may be used to implement communications fabric 802 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 906 or a cache such as found in an interface and memory controller hub that may be present in communications fabric 902.

Data is typically stored in a structured manner as to allow the data to be subject to query and analysis. Typically, this structure takes the form of one or more database tables having records that are arranged in a specific manner. These database tables may be queried and analyzed using database query and analysis commands such as are generally known in the art. For example, the Structured Query Language (SQL) is a declarative language used to interrogate and process data in a relational database.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc. or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown. In succession may, in fact, be executed substantially concurrently, or the blocks may sometimes be executed in the reverse order depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method of joining one or more first database objects with one or more second database objects comprising:

determining a weight for each of a plurality of join predicates between one or more of the first database objects and one or more of the second database objects based on a join selectivity for each of the plurality of join predicates, wherein the join selectivity comprises an estimation of a portion of a total number of values in database objects that will be included in the join based on a particular predicate;

sorting the plurality of join predicates based on the determined weights; and performing a join operation to join the one or more first database objects with the one or more second database objects in accordance with an order of the sorted plurality of join predicates, wherein determining the weight for each of the plurality of join predicates comprises:

determining the join selectivity for each join predicate comprising determining a frequency in each of the first database objects of values that are used to perform the join, and determining the weight according to the following formula:

$$weight = (1 - join\_selectivity)/lookup\_cost;$$

wherein the lookup cost comprises an estimation of the resources that would be used to perform the join.

2. The computer-implemented method of claim 1, wherein the first database objects include a uniform distribution of data.

3. The computer implemented of method of claim 1, wherein determining the frequency in each of the first database objects comprises determining an individual frequency for each value that satisfies the join predicate in the first database object, and summing the individual frequencies to determine an overall frequency for each first database object.

4. The computer-implemented method of claim 1, wherein determining the weight for each join predicate comprises determining at runtime the frequency of values for each of the first database objects that are used to perform the join.

5. The computer implemented method of claim 1, wherein at least one of the plurality of first database objects is encoded according to a frequency-based encoding, and
wherein determining the frequency in the one or more first database objects of the values that are used to perform the join is determined according to the length of frequency-encoded values.

6. The computer-implemented method of claim 5, wherein determining the frequency in each of the one or more first database objects of the values that are used to perform the join comprises encoding values from the second database object according to a dictionary for the one or more first database objects.

7. The computer-implemented method of claim 5, wherein determining the frequency in each of the first database objects of the values that are used to perform the join comprises estimating the frequency according to the length of the encoded values.

8. The computer-implemented method of claim 5, wherein the frequency-based encoding comprises Huffman encoding.

9. The computer implemented method of claim 1, wherein the first database object comprises a column-oriented table.

10. The computer-implemented method of claim 1, where in at least one of the one or more first database objects comprises an outer leg for at least one of the join predicates.

11. The computer-implemented method of claim 1, wherein the plurality of join predicates comprises a plurality of join predicates for a single join between a first database object and a second database object.

12. The computer-implemented method of claim 1, where the plurality of join predicates comprise a plurality of join predicates joining a first database object with a plurality of second database object.

13. A computer program product comprising:
a non-transitory computer readable storage medium having computer readable code embodied therewith, the computer readable program code comprising computer readable program code configured to:
determine a weight for each of a plurality of join predicates between one or more first database objects and one or more second database objects based on a join selectivity for each of the plurality of join predicates, wherein the join selectivity comprises an estimation of a portion of a total number of values in database objects that will be included in the join based on a particular predicate;
sort the plurality of join predicates based on the determined weights; and
perform a join operation to join the one or more first database objects with the one or more second database objects in accordance with an order of the sorted plurality of join predicates,
wherein the code configured to determine the weight for each of the plurality of join predicates is configured to:
determine the join selectivity by determining a frequency in each of the first database objects of values that are used to perform the join, and
determine the weight according to the following formula:

$$weight = (1 - join\_selectivity)/lookup\_cost;$$

wherein the lookup cost comprises an estimation of the resources that would be used to perform the loin.

14. The computer program product of claim 13, wherein at least one of the plurality of first database objects is encoded according to a frequency-based encoding, and
wherein the code configured to determine the frequency in each of the first database objects of values that are used to perform the join is configured to determine the frequency according to the length of frequency-based encoded values.

15. The computer program product of claim 14, wherein the code configured to determine the frequency in each of the first database objects of values that are used to perform the join is configured to encode values from the second database object according to a dictionary for the one or more first database objects.

16. A system comprising:
at least one processor configured to:
determine a weight for each of a plurality of join predicates between one or more of first database objects and one or more of second database objects based on a join selectivity for each of the plurality of join predicates, wherein the join selectivity comprises an estimation of a portion of a total number of values in database objects that will be included in the join based on a particular predicate;
sort the plurality of join predicates based on the determined weights; and
perform a join operation to join the one or more first database objects with the one or more second database objects in accordance with an order of the sorted plurality of join predicates,
wherein the processor is configured to determine the weight for each of the plurality of join predicates by:
determining the join selectivity by determining a frequency in each of the first database objects of values that are used to perform the join, and
determining the weight according to the following formula:

$$weight = (1 - join\_selectivity)/lookup\_cost;$$

wherein the lookup cost comprises an estimation of the resources that would be used to perform the join.

17. The system of claim 16, wherein at least one of the plurality of first database objects is encoded according to a frequency-based encoding; and wherein the processor is further configured to determine the frequency according to the length of the frequency-based encoded values.

\* \* \* \* \*